(12) United States Patent
Fischer

(10) Patent No.: US 8,886,590 B2
(45) Date of Patent: Nov. 11, 2014

(54) MASTER DATA MANAGEMENT IN A DATA WAREHOUSE/DATA MART

(75) Inventor: Uwe Fischer, Karlsruhe (DE)

(73) Assignee: SAP AG, Walldorf (DE)

( * ) Notice: Subject to any disclaimer, the term of this patent is extended or adjusted under 35 U.S.C. 154(b) by 120 days.

(21) Appl. No.: 13/053,681

(22) Filed: Mar. 22, 2011

(65) Prior Publication Data

US 2012/0246110 A1 Sep. 27, 2012

(51) Int. Cl.
*G06F 7/00* (2006.01)
*G06F 17/00* (2006.01)

(52) U.S. Cl.
CPC .................... *G04F 17/30592* (2013.01)
USPC ............................. 707/602; 707/607

(58) Field of Classification Search
None
See application file for complete search history.

(56) References Cited

U.S. PATENT DOCUMENTS

| | | | |
|---|---|---|---|
| 7,272,776 B2* | 9/2007 | Kalthoff et al. | 714/769 |
| 7,720,804 B2* | 5/2010 | Fazal et al. | 707/601 |
| 8,311,975 B1* | 11/2012 | Gonsalves | 707/606 |
| 2007/0061287 A1* | 3/2007 | Le et al. | 707/2 |
| 2007/0198536 A1* | 8/2007 | Coutts et al. | 707/10 |
| 2007/0239508 A1* | 10/2007 | Fazal et al. | 705/8 |
| 2007/0239769 A1* | 10/2007 | Fazal et al. | 707/102 |
| 2009/0037236 A1* | 2/2009 | Miller et al. | 705/7 |
| 2010/0250620 A1* | 9/2010 | Maier et al. | 707/803 |
| 2010/0257135 A1* | 10/2010 | Wolfe et al. | 707/602 |
| 2010/0332510 A1* | 12/2010 | Gitai et al. | 707/759 |
| 2011/0055147 A1* | 3/2011 | Joerg et al. | 707/602 |

* cited by examiner

*Primary Examiner* — Tony Mahmoudi
*Assistant Examiner* — Tuan A Pham
(74) *Attorney, Agent, or Firm* — Fountainhead Law Group PC

(57) ABSTRACT

A data warehouse incorporates processing for creating, managing, and otherwise maintaining master data. The data warehouse may communicate with a master data manager to obtain services for handling master data. A surrogate master data identifier may be defined by the data warehouse to reference the master data, thereby decoupling any modifications of the master data identifier that may be made by the master data manager. The data warehouse may export the master data to an application system, and conversely import master data from an application system.

13 Claims, 4 Drawing Sheets

MASTER DATA MANAGEMENT IN A DATA WAREHOUSE/DATA MART

BACKGROUND

The present invention relates to data warehousing, and in particular, to the integration of master data management in a data warehouse.

Unless otherwise indicated herein, the approaches described in this section are not prior art to the claims in this application and are not admitted to be prior art by inclusion in this section.

Referring to FIG. 4, a data warehouse 402 typically comprises a database 404 containing data that is received from various operating groups in an organization; e.g., marketing, production, sales, customer service, and so on. Typical application systems that the operating groups execute include applications such as PLM (product lifecycle management) 408a, CRM (customer relationship management) 408b, PPS (product production system) 408c, and so on. These applications typically generate the data (referred to as "transaction data") that is to be stored in the data warehouse 402. For example, transaction data may be information relating to the sale of widgets: where the sale occurred, when the sale took place, the sale price, and so on. Transaction data may be information about the production of widgets: how many where produced at a given manufacturing site, information about the raw materials used to make the widgets and so on. Typically, the transaction data generated by the application systems 408a-408c are transformed by an ETL (extraction, transformation, load) process 406a and then loaded into the data warehouse 402.

Data marts 410 are sets of data that can be customized and otherwise targeted for a given group or used within the organization; e.g., business planning for a new product, customer servicing, development of a new manufacturing process, and so on. Data marts 410 may comprise a subset of the data stored in the data warehouse database 404 and may or may not include transformation by the ETL process 406a. Data marts 410 may comprise data collected from the various applications systems 408a-408c and typically involves transformation by the ETL process 406a.

Another aspect of an organization is its master data. Master data provides a single, unified view of data that may be generated and/or referenced by the various operating groups and their respective application systems 408a-408c. Referring to FIG. 4, an MDM system 412 typically communicates with the other operational systems, for example, via an ETL layer 406b or by way of API (application programming interface) calls executed by their software applications 408a-408c. The management of such data, referred to as master data management (MDM) is a strategy/process for creating, managing and maintaining such data. An MDM strategy typically includes components like universal agreement on data definitions, data governance policies to guide the collection and management of data, enforcement of these standards, and technology to reconcile and standardize data from the various operative applications systems of the organization.

SUMMARY

Embodiments of the present invention provide a data warehouse integrated with management of master data. In an embodiment, a computer system performs steps of operating as a data warehouse, including receiving transaction data and master data from the application systems of an organization. In embodiments, the data warehouse may create master data. The master data may be assigned information based on information contained in transaction data received from different application systems. The master data may include information based on a business plan. The master data may include one or more master data identifiers.

In embodiments, the master data may be communicated to one of the application systems. Conversely, master data may be imported from an application system.

In embodiments, the master data is initially accessible only to the user who created it. The master data may be designated as being accessible by a group of users. The master data may be designated as being accessible to all members in an organization. The master data may be published to members outside of the organization. More generally, the master data may be subject to a lifecycle that assigns different levels of accessibility at different points in time.

The data warehouse may receive updated master data from the master data management process wherein the first master data identifier is modified. In embodiments, the data warehouse references the master data using the second master data identifier.

The following detailed description and accompanying drawings provide a better understanding of the nature and advantages of the present invention.

DETAILED DESCRIPTION

Described herein are techniques for operating a data warehouse. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
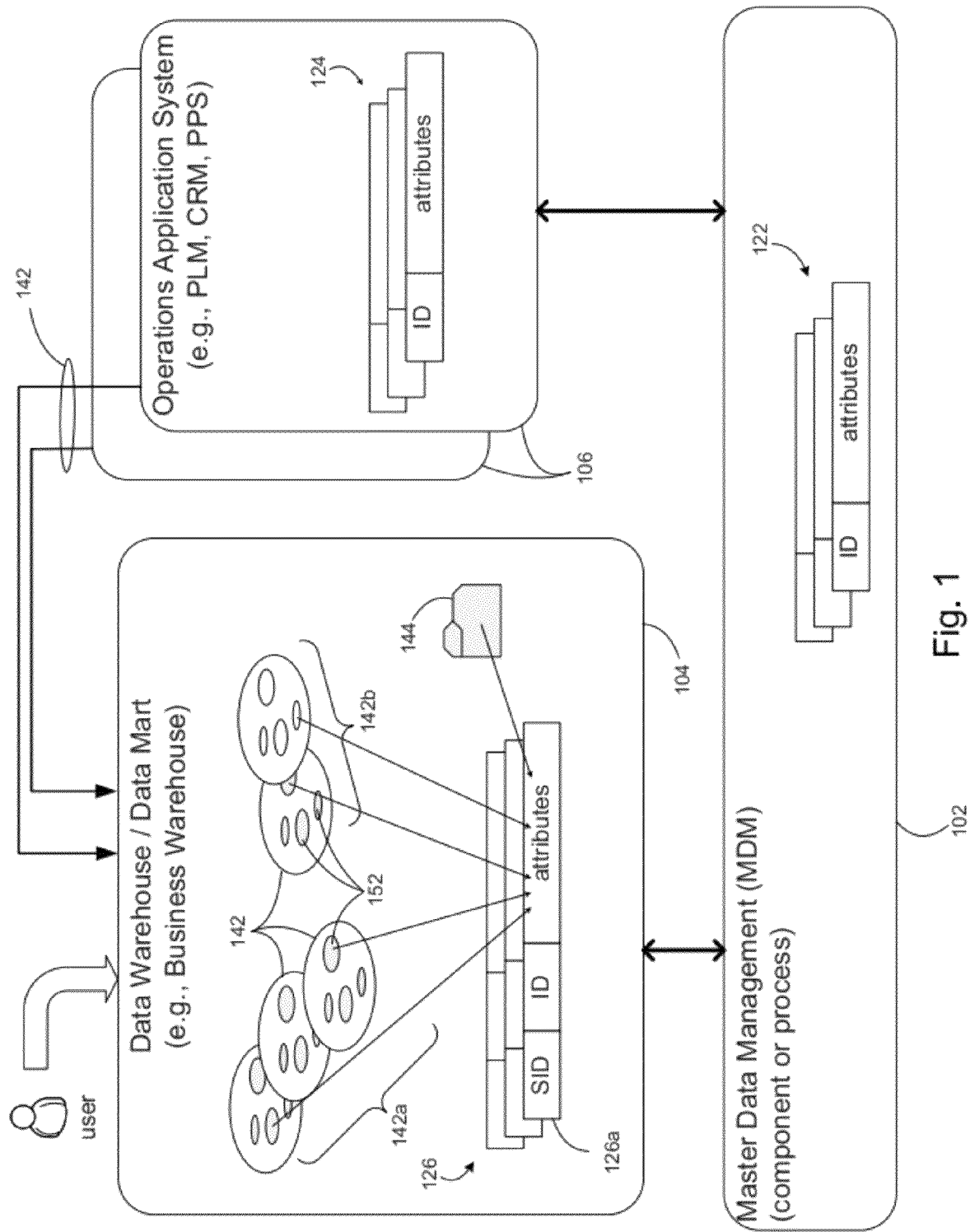
FIG. 1 illustrates a data warehouse environment according to an embodiment of the present invention.

In embodiments, such as exemplified in FIG. 1, a data warehouse or data mart 104 in an organization may receive transaction data 142 from various operations groups. Going forward, the term "data warehouse" will be understood to refer to both a data warehouse or to a data mart. Transaction data may be generated by applications software systems ("operations application system", "application system") that are used by the operations groups. Typical application systems 106 include PLM (product lifecycle management), CRM (customer relationship management), PPS (product production system), and ERP (enterprise resource planning). Each application system 106 may generate transaction data 142 which is loaded and stored in the data warehouse 104. For example, the data warehouse 104 may define a database for each application system that it receives transaction data 142 from. Transaction data 142 received from an application system 106 may be stored as records in the corresponding database in the data warehouse 104. The figure shows the various data elements that comprise the transaction data 142 with the reference numeral 152. The data elements 152 may refer to individual pieces of data (e.g., "Mr. Miller"), or structures of data (e.g., an Address data structure that comprises various fields such as street, city, country, etc.). The data warehouse 104 stores each transaction and over time accumulates a history of transactions that have occurred among the various operations groups. The accumulated historical data may be stored (e.g., as key figures) separate from the context that the values are associated with (e.g., customer, time, product). The contextual information itself may be treated as master data.

The data warehouse 104 may include one or more business plans 144 that users of the data warehouse may create, define, and refine. A business plan 144 may be developed from an analysis of the transaction data 142 stored in the data warehouse 104. For example, CRM transaction data over a one year period may indicate an opportunity to introduce a new product. A business plan might be created and developed to take advantage of such an opportunity.

In embodiments, the data warehouse 104 may further include one or more master data 126. Master data 126 provide a single, unified reference for the transaction data that may be generated by the various application systems 106. Each instance of master data 126, comprises a surrogate identifier (SID), a master data identifier (ID), and one or more attributes. Attributes of the master data 126 may comprise information specified in a business plan 144 (e.g., T-shirt size, color) or from data 152 comprising transaction data 142. Attributes of the master data 126 may be derived from information in a business plan 144 or from data 152 comprising transaction data 142. Attributes of the master data 126 may also comprise information from transaction data 142 received from different application systems. For example, this aspect of the present invention is illustrated in FIG. 1, where the attributes for master data 126*a* comprise information from transaction data 142*a* that is received, say, from a first application system and transaction data 142*b* that is received, say, from a second application system.

FIG. 1 shows conventional master data 124 created and stored in an application system 106. Typically, the master data comprises a master data identifier (ID) and one or more attributes. A master data management (MDM) process 102 communicates with the data warehouse 104 and the application systems 106. A suitable application programming interface (API) can be provided which allows programmatic access (e.g., via system calls, remote service calls, etc.) to the MDM process 102 from the data warehouse 104 system and the application systems 106. In embodiments, the data warehouse 104 system and the application systems 106 can use message-based communications, or combinations of API calls and message-based communications.

The MDM process 102 typically provides the highest view of all the data of the organization. The MDM process 102 may contain a set of master data 122 that reflect that organization level view. Each piece of master data may include a consolidated key (ID) as well as a consolidated set of associated attributes. The MDM process 102 employs compliance rules and other governing rules to enforce adherence to standards established for representing the myriads pieces of data of the organization. One of the functions of the MDM process 102 is to ensure consistency between the master data created in application systems 106 with the master data maintained in the MDM process. In accordance with aspect of the present invention, the functionality of the MDM process 102 is provided to the data warehouse 104 to allow the data warehouse to create, develop, maintain, and otherwise manage master data.

Figure 3:
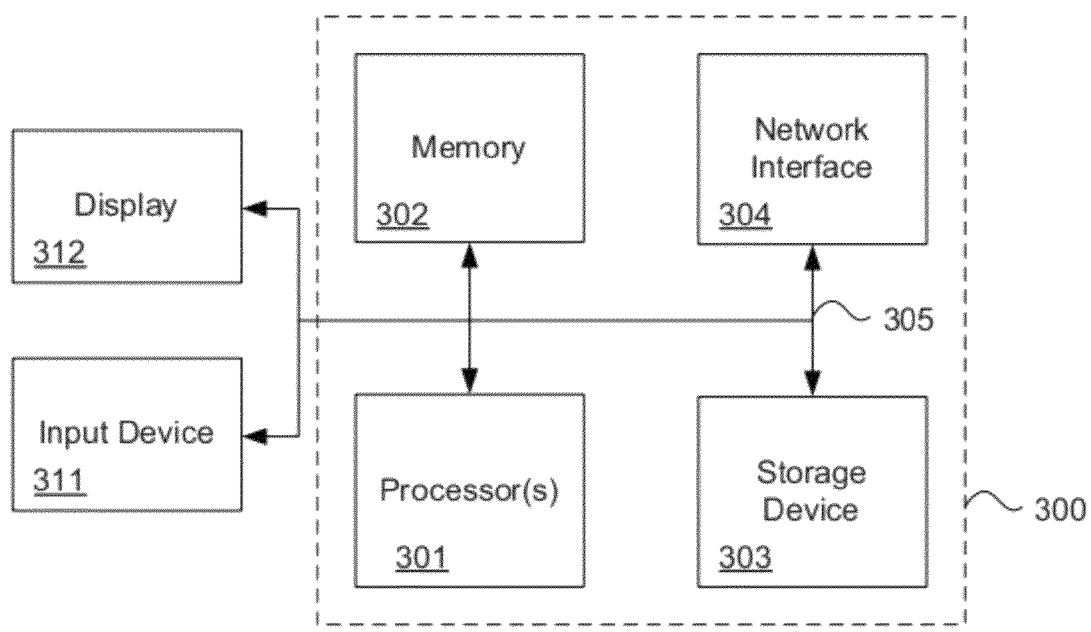
FIG. 3 illustrates a computer architecture that can embody the data warehouse system in accordance with the present invention.
Figure 4:
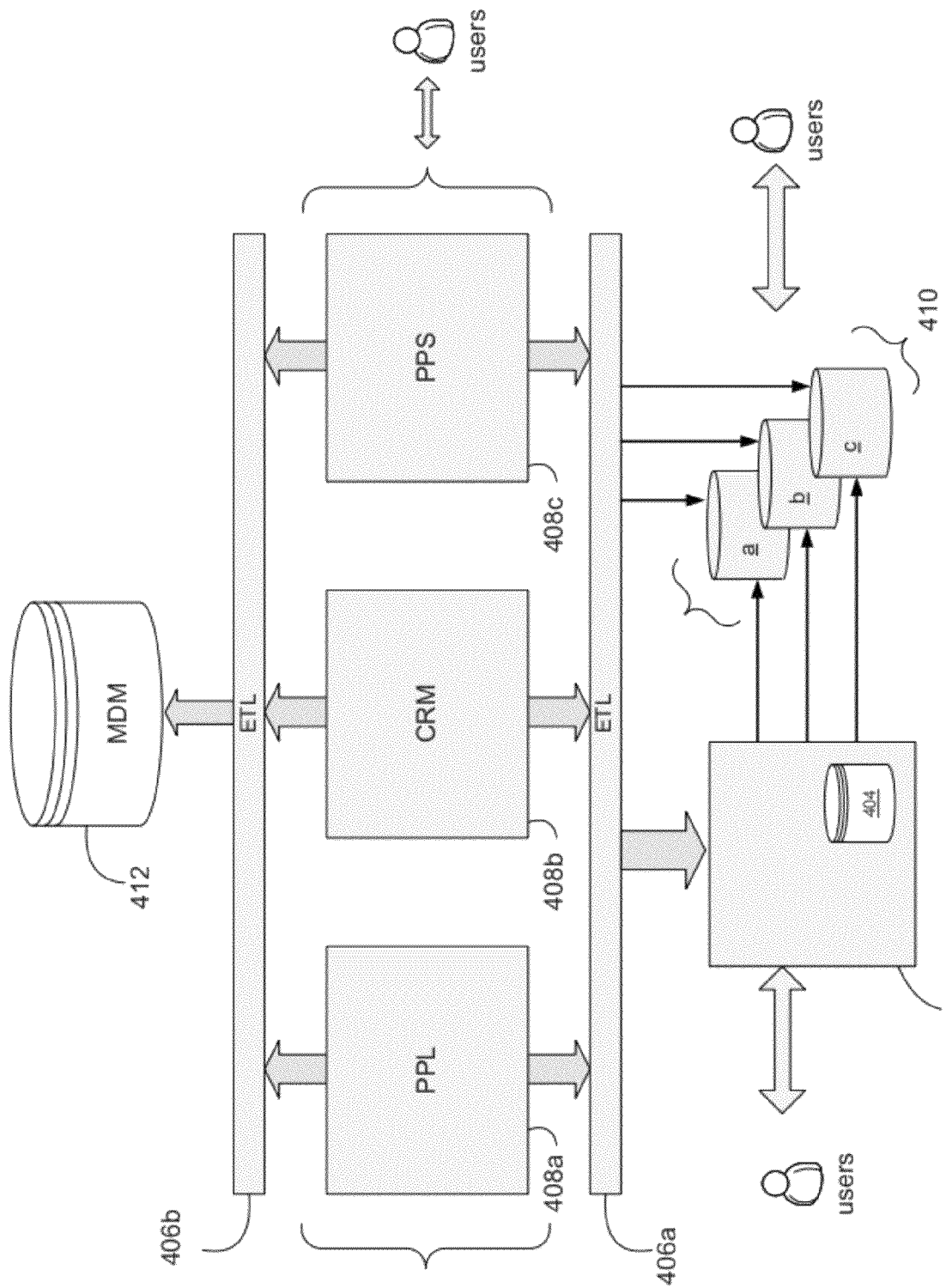
FIG. 4 illustrates a conventional data warehouse architecture.

Referring to FIG. 3, in embodiments, a computer system 300 can be configured to operate in accordance with aspects of the present invention. For example, computer system 300 may be configured as the data warehouse 104, or an application system 106, or the MDM process 102 illustrated in FIG. 1. A data processor subsystem 301 may comprise one or more data processing units. A memory subsystem 302 may comprise random access memory (usually volatile memory such as DRAM) and non-volatile memory such as FLASH memory, ROM, and so on. A storage subsystem 303 may comprise one or more mass storage devices such as hard disk drives and the like. The storage subsystem 303 may include remote storage systems; e.g., for data mirroring, remote backup and such. The storage subsystem 303 can provide the data storage for the databases that might be deployed in the data warehouse 104, the application systems 106, or the MDM process 102.

A network interface subsystem 304 can provide communication between the data warehouse 104, the application systems 106, and the MDM process 102, for example over a telecommunication network. A system of buses 305 can interconnect the foregoing subsystems, providing control lines, data lines, and/or voltage supply lines to/from the various subsystems. The computer system 300 may include a suitable display(s) 312 and input devices 311 such as a keyboard and a mouse input device.

The memory subsystem 302 may have stored in the non-volatile memory computer executable programs, which when executed can cause the data processing subsystem 301 to perform various processing steps in accordance with aspects of the present invention.

Figure 2:
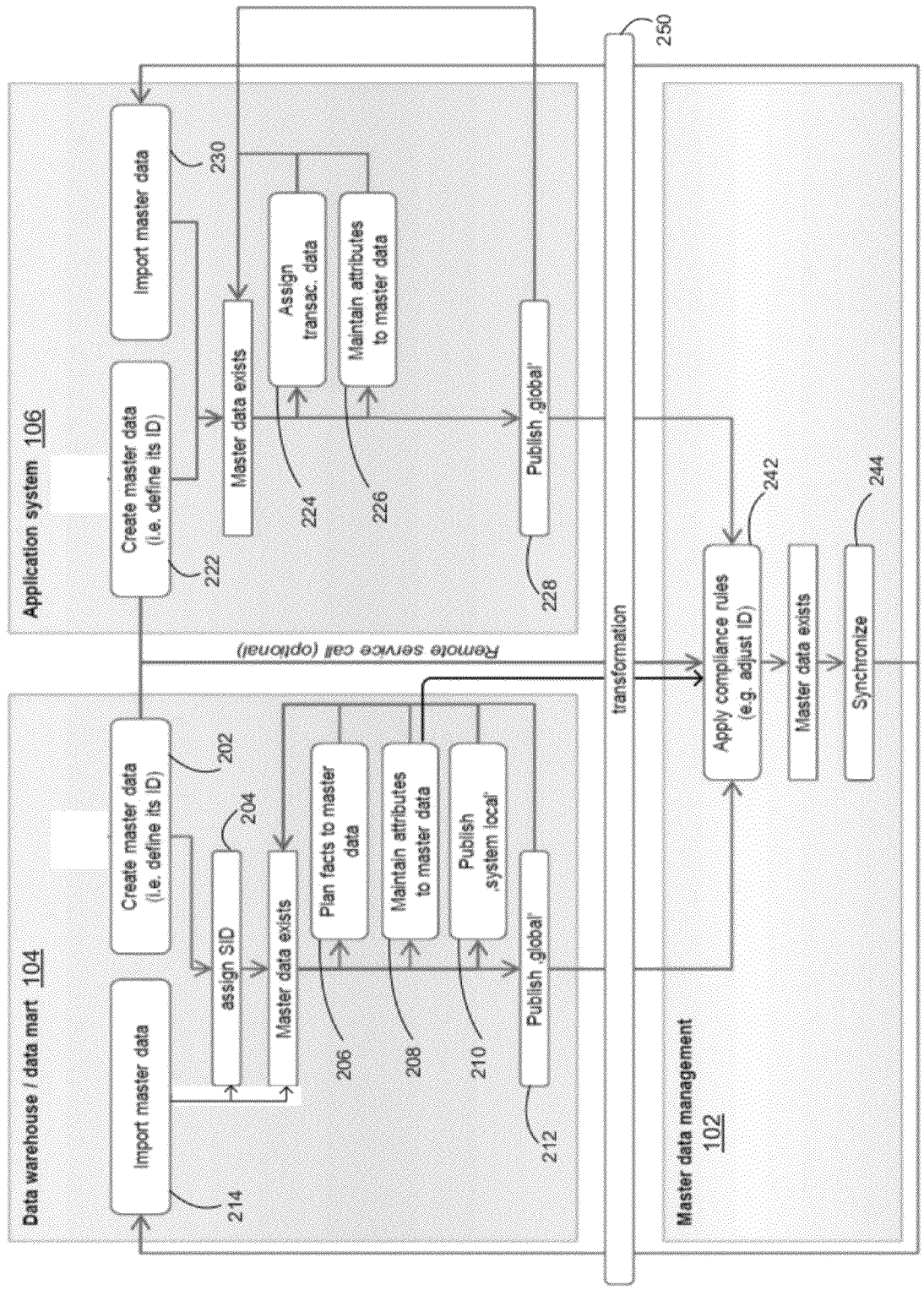
FIG. 2 illustrates an embodiment of processing in a data warehouse environment in accordance with the present invention.

In embodiments, processing in the data warehouse 104 may proceed as shown in FIG. 2. First, a discussion of conventional master data processing in an application system 106 will be given, followed by a discussion of master data processing in the data warehouse 104 in accordance with embodiments of the present invention.

In an application system 106, master data processing may begin at step 222 with the creation of new master data. This may include making remote service calls to the MDM process 102 to ensure that compliance rules for the new master data are met; for example, identify what are the mandatory fields of the new master data. The master data may include a master data identifier (ID) that is defined by the application system 106. The master data is deemed to "exist" at this point. In a step 224, the new master data may be assigned with information from transaction data generated by the application software; this does not change the 'existence' of the master data. The master data can cycle back to step 224 for the assignment of information from new transaction data generated by the application system 106. Alternatively, in a step 226, the master data can be maintained in terms of its constituent attributes; for example, information in the master data (e.g., the color of a T-shirt or its size) might have changed and so the master data may need to be updated to reflect the changed information.

The master data may remain "local" to the application system 106 that created it and be accessible only by members of the operating group corresponding to that application system. When it is determined that the master data is ready to be used by entities outside of the application system 106, then in a step 228 the master data can be designated "global". For example, the master data may relate to a new product which is now ready to be manufactured. The master data may be published to the various manufacturing groups in the organization. As another example, the master data may relate to a proposal for collaboration with a business which is now ready for presentation to that business. Again the "global" use of the master data does not change its 'existence' locally in system 106.

In step 228, the master data can be communicated to the MDM process 102. This may involve various transformations 250 (e.g., performed by an ETL process) to facilitate the communication of data to the MDM process 102.

In a step 242, compliance rules in the MDM process may be applied to the master data created by the application system 106 to ensure that the master data conforms to the rules set forth in the MDM process 102. The MDM process 102 may enhance, adapt, or otherwise modify the master data in accordance with those compliance rules. For example, suppose the master data identifier (ID) assigned by the application system 106 was a simple running counter that increments from 1 to N. While this ID numbering convention may be suitable for the application system 106, it may not be suitable at the organization level. The MDM process 102 may need to map the ID to an organization-level ID (e.g., to comply with the organization's naming standards). Other compliance rules may ensure that all customer names are formatted in consistent manner, identify semantic duplicates in the landscape, and so on. The result may be a revised master data that is compliant with the compliance rules set forth in the MDM process 102.

In a step 244, the master data in the MDM process 102 can be synchronized with the corresponding master data in the application system 106. This can be used to update the copy of master data in the application system 106 if the master data was modified by the MDM process 102 as a result of applying the compliance rules. Thus, in a step 230, the application system 106 may import the master data received from the MDM process 102. The received master data may then be used to update the copy maintained by the application system 106. Where the MDM process 102 has changed the ID of the master data, then the application system 106 can change the ID as well as references to it. In embodiments, a mapping can be used to keep track of the ID used in the application system 106 and the ID used in the MDM process 102.

The discussion will now proceed to processing in the data warehouse 104 in accordance with embodiments of the present invention. The discussion begins with a user accessing the data warehouse 104 to create a new plan 144. A typical usage scenario might be that an analysis of financial transaction data collected from the application systems 106 of the organization's operating groups might indicate opportunities for new business. Consequently, a plan 144 might be developed to introduce a product to exploit such opportunities.

Another usage scenario might arise in connection with the process of new product data introduction. Typically, the process focuses on information provided by a PLM system and a PPS system. However, financial applications may also trigger new product development efforts; e.g., when simulating better or new market penetration, a new product might be relevant. This could be readily accomplished within the data warehouse 104, where the financial impact can be readily simulated. If the product showed sufficient potential for the organization's future, then it could be introduced to the PLM and PPS systems for subsequent design and manufacture.

A similar usage scenario can be imagined for customer groups. For marketing reasons, it might be relevant to extend the penetration of a product into new customer groups. Such activity can be simulated (e.g., with respect to financial impact) within the data warehouse 104 before involving other systems such as CRM. If the simulation shows promise, then the plan to penetrate other customer groups can be taken to the subsequent CRM system for implementation; e.g., develop campaigns and so on.

In the above scenarios, the creation of master data within the data warehouse 104 facilitates such planning activities because forecasts and simulations can be readily compared with actual transaction data collected by the data warehouse from the various application systems 106. As an initial step then, the user may log onto the data warehouse 104 via a suitable user interface. The user may access a previously stored plan, or the user may request the creation of a new plan. In a step 202, a new piece of master data may be created in the data warehouse 104 in connection with a business plan. Creating the master data may include making remote service calls to the MDM process 102 to ensure that compliance rules for the new master data are met. For example, the data warehouse 104 may communicate information to the MDM process 102 about the attributes and data formats comprising the master data. The MDM process 102 may return with information that a particular field is mandatory, or that a particular attribute requires a specific data format, and so on. Since MDM processing and communications are known in connection with communication between application systems 106 and the MDM process 102, the specific details of such communications with the data warehouse 104 need not be further elaborated on.

The master data may include a master data identifier (ID) that is defined by the user or MDM process 102. In a step 204, a surrogate ID may be defined by the data warehouse 104 and associated with the master data. The master data created in the data warehouse 104 is deemed to "exist" at this point.

In a step 206, one or more key figures (i.e., facts such as sales figures, production quantities and so on) may be assigned to the master data based on information comprising the business plan (e.g., expected revenue figures from a sales projection plan, or expected materials cost from a parts requirement projection plan, and so on). The master data may cycle back to step 206 for the assignment of additional key figures for the plan. This does not change the 'existence' of the master data.

In a step 208, attributes in the master data may be maintained. For example, changes in existing attributes (e.g., T-shirt size, color) may need to be made in the master data based on information comprising the business plan. MDM services may be called to ensure that the attribute settings comply to the rules defined in the MDM. (remark: an arrow needs to be added in FIG. 2. From 208 to 242). The master data may cycle back to steps 206 and 208 for one or more iterations in order to revise, update, and otherwise maintain the master data.

In embodiments, the master data may be initially designated to be "user local." This designation means that the master data is accessible only to the user who created it. The data warehouse 104 can restrict access to master data that is designated "user local" to only the creator. This restricted access gives the user/creator time to develop and modify the master data and assigned key figures for the plan without fear of anyone inadvertently using it before it is ready to be used or examined. The master data may be discarded in case the simulation does not provide the desired results or for any other reason, including the invalidation of the key figures referring to it.

In embodiments, the data warehouse 104 may allow the master data to be accessible to a wider group of users. For example, a user in a marketing group who created a new master data may be ready to present that master data to the other members of the marketing group for peer review and further development. Thus, in a step 210, the master data may be designated "system local." The data warehouse 104 may grant access to master data that is designated "system local" to only those users who are members of a designated group. Typically, the creator of the master data will also be a member of the designated group. However, in an embodiment the designated group may be a group that the creator is not a member of. In an embodiment, the "system local" designation may include two or more groups. When master data is designated as "system local", members of the designated group(s) can collaborate to further refine the master data or assigne key figures to it. The master data may be cycled back to step 206 for further refinement with the business plan and/or to step 208 for further updates with attributes. The master data may be discarded in case the simulation does not provide the desired results or for any other reason, including the invalidation of the key figures referring to it.

In embodiments, the master data may be designated "global"; e.g., the master data may be published (step 212) to entities outside of the data warehouse 104. Publishing the master data may involve application of the compliance rules (step 242) by the MDM process 102. The compliance rules can ensure that the master data conforms to the rules that govern all the master data of the organization. The MDM process 102 may modify the master data. The result of step 242 may be modified master data that conforms with the compliance rules. In a step 244, the master data may be redistributed back to the data warehouse 104, where in a step 214 the received master data can be imported back into the data warehouse. The received master data may then be used to update the copy maintained by the data warehouse 104, thus synchronizing the master data between the data warehouse and the MDM process 102.

In embodiments, the data warehouse 104 can use the surrogate identifier (SID) of the master data to keep track of the master data instead of using the master data identifier (ID). Thus, if the MDM process 102 had modified the master data identifier (ID) as a result of applying its compliance rules (e.g., to comply with the organization's naming standards), then data warehouse 104 can still identify the master data even thought the master data identifier had been modified.

In embodiments, master data created in the application system 106 can be exported to the data warehouse 104 by way of the synchronization step 244 in the MDM process 102. Thus, for example, if the application system 106 creates master data and it was desired that the master data should be exported to the data warehouse 104, then the application system can publish the master data with a suitable indication (e.g. a status of the master data indicating that transactional data relevant for the data warehouse 104 may be created) to the MDM process 102. The MDM process 102 can then apply the compliance rules to ensure compliance with the governing rules of the organization's master data policies, possibly modifying the master data. Then, in the synchronization step 244, the master data can be synchronized to the data warehouse 104, where the master data could be imported into the data warehouse in step 214.

It can be appreciated of course that master data created in the data warehouse 104 can be exported to an application system 106 in a similar manner. For example, master data created and refined in the data warehouse 104 can be published at step 212 with a suitable indication (e.g. a status indicating that the master data needs to be enriched by engineering data in a PLM system) to the MDM process 102. The MDM process 102 can then apply the compliance rules to ensure compliance with the governing rules of the organization's master data policies, possibly modifying the master data. Then, in the synchronization step 244, the master data can be synchronized to the appropriate application system 106, where the master data would be imported into the application system in step 230.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method for a data warehouse comprising operating a computer system to perform steps of:
    the data warehouse receiving transaction data from a plurality of application systems comprising an organization and storing the transaction data in the data warehouse;
    the data warehouse analyzing transaction data stored in the data warehouse to create one or more business plans in the data warehouse;
    the data warehouse generating new data in the data warehouse from one or more business plans;
    the data warehouse instantiating new master data and one or more master data identifiers from the new data and storing the new master data in the data warehouse, including the data warehouse:
        communicating information descriptive of the new data to a master data management process; and
        receiving from the master data management process information indicative of compliance of the new data including whether the new data requires a mandatory data field or that an attribute of the new data requires a specific format;
    the data warehouse using the master data to facilitate business planning activity in the data warehouse;
    the data warehouse maintaining the master data in the data warehouse, including the data warehouse:
        receiving a change in an attribute of the master data;
        communicating the change to the master management process; and
        receiving from the master management process a revision or an update to the master data;
    the data warehouse sending the master data to an application system, including sending the master data to the master data management process, wherein the master data management process sends the master data received from the data warehouse to the application system; and
    the data warehouse importing updated master data from the master data management process, wherein the updated master data conforms with compliance rules set forth in the master data management process, wherein one of the one or more master data identifiers is revised, wherein the data warehouse references the master data using a surrogate master data identifier associated with the master data.

2. The method of claim 1 wherein the master data is initially accessible only to a user who created the master data, the method further comprising designating the master data as being accessible to a group of users.

3. The method of claim 2 wherein the user who created the master data is a member of the group of users.

4. The method of claim 1 wherein the master data is initially accessible only to a user who created the master data, the method further comprising designating the master data as being accessible to everyone in the organization.

5. The method of claim 1 wherein the data warehouse receives transaction data from every application system comprising the organization.

6. A non-transitory computer-readable storage medium having stored thereon computer executable program code comprising computer executable instructions configured to cause a data processing system to operate as a data warehouse, including:

the data warehouse receiving transaction data from a plurality of application systems comprising an organization;

the data warehouse analyzing transaction data stored in the data warehouse to create one or more business plans in the data warehouse;

the data warehouse generating new data in the data warehouse from one or more business plans;

the data warehouse instantiating new master data and one or more master data identifiers from the new data and storing the new master data in the data warehouse, including the data warehouse:

communicating information descriptive of the new data to a master data management process; and receiving from the master data management process information indicative of compliance of the new data including whether the new data requires a mandatory data field or that an attribute of the new data requires a specific format;

the data warehouse using the master data to facilitate business planning activity in the data warehouse;

the data warehouse maintaining the master data in the data warehouse, including the data warehouse:

receiving a change in an attribute of the master data;

communicating the change to the master management process; and receiving from the master management process a revision or an update to the master data;

the data warehouse sending the master data to an application system, including sending the master data to the master data management process, wherein the master data management process sends the master data received from the data warehouse to the application system; and the data warehouse importing updated master data from the master data management process, wherein the updated master data conforms with compliance rules set forth in the master data management process, wherein one of the one or more master data identifiers is revised, wherein the data warehouse references the master data using a surrogate master data identifier associated with the master data.

7. The non-transitory computer-readable storage medium of claim 6 further comprising computer executable instructions configured to cause a data processing system to send the master data to an application system.

8. The non-transitory computer-readable storage medium of claim 6 wherein the master data is initially accessible only to a user who created the master data, the computer-readable storage medium further comprising computer executable instructions configured to cause a data processing system to designate the master data as being accessible to a group of users.

9. The non-transitory computer-readable storage medium of claim 6 wherein the master data is initially accessible only to a user who created the master data, the computer-readable storage medium further comprising computer executable instructions configured to cause a data processing system to designate the master data as being accessible to everyone in the organization.

10. A computer system comprising:

one or more processors; and a memory having stored thereon a software program, executable on the computer system, the software program configured to cause the one or more processors to perform steps of:

operating the computer system as a data warehouse, including the data warehouse receiving transaction data from a plurality of application systems comprising an organization;

the data warehouse analyzing transaction data stored in the data warehouse to create one or more business plans in the data warehouse;

the data warehouse generating new data in the data warehouse from one or more business plans;

the data warehouse instantiating new master data and one or more master data identifiers from the new data storing the new master data in the data warehouse, including the data warehouse:

communicating information descriptive of the new data to a master data management process; and receiving from the master data management process information indicative of compliance of the new data including whether the new data requires a mandatory data field or that an attribute of the new data requires a specific format;

the data warehouse using the new master data to facilitate business planning activity in the data warehouse;

the data warehouse maintaining the new master data in the data warehouse, including the data warehouse:

receiving a change in an attribute of the new master data;

communicating the change to the master management process; and receiving from the master management process a revision or an update to the new master data;

the data warehouse sending the master data to an application system, including sending the master data to the master data management process, wherein the master data management process sends the master data received from the data warehouse to the application system; and the data warehouse importing updated master data from the master data management process, wherein the updated master data conforms with compliance rules set forth in the master data management process, wherein one of the one or more master data identifiers is revised, wherein the data warehouse references the master data using a surrogate master data identifier associated with the master data.

11. The computer system of claim 10 further comprising importing master data from an application system.

12. The computer system of claim 10 wherein the master data is initially accessible only to a user who created the master data, the computer system further comprising designating the master data as being accessible to a group of users.

13. The computer system of claim 10 wherein the master data is initially accessible only to a user who created the master data, the computer system further comprising publishing the master data to entities outside of the organization.

* * * * *